United States Patent
Chen et al.

(10) Patent No.: US 12,333,115 B1
(45) Date of Patent: Jun. 17, 2025

(54) TOUCH DEVICE, TOUCH DRIVING INTEGRATED CIRCUIT AND OPERATION METHOD

(71) Applicant: Novatek Microelectronics Corp., Hsinchu (TW)

(72) Inventors: Yi-Wei Chen, Tainan (TW); Weijen Chang, Tainan (TW); Chin-Lin Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/764,180

(22) Filed: Jul. 4, 2024

(51) Int. Cl.
   *G06F 3/044* (2006.01)
   *G06F 3/0354* (2013.01)
(52) U.S. Cl.
   CPC .......... *G06F 3/044* (2013.01); *G06F 3/03545* (2013.01)

(58) Field of Classification Search
   None
   See application file for complete search history.

(56) References Cited

U.S. PATENT DOCUMENTS

| | | | |
|---|---|---|---|
| 2020/0301548 A1* | 9/2020 | Onoda | H04W 4/80 |
| 2022/0057882 A1* | 2/2022 | Lee | G06F 3/0446 |
| 2023/0409143 A1* | 12/2023 | Nomura | G06F 3/04166 |

* cited by examiner

*Primary Examiner* — Stephen T. Reed
(74) *Attorney, Agent, or Firm* — JCIPRNET

(57) ABSTRACT

The touch driving integrated circuit (IC) drives the touch sensing electrodes of a touch panel. The touch driving IC sends an uplink signal to an active stylus on the touch panel through the touch panel. The touch driving IC receives a downlink signal from the active stylus through the touch panel. The touch driving IC decodes the downlink signal to obtain posture information about the posture of the active stylus. The touch driving IC reports the posture information of the active stylus together with position information about the position of the active stylus on the touch panel to a system processor.

26 Claims, 11 Drawing Sheets

TOUCH DEVICE, TOUCH DRIVING INTEGRATED CIRCUIT AND OPERATION METHOD

BACKGROUND

Technical Field

The disclosure relates to a touch device, and in particular to a touch driving integrated circuit and an operation method thereof.

Description of Related Art

The demand from users for using stylus to write, draw, and other inputs on touch devices is increasing day by day, so various stylus (passive stylus or active stylus) products have been produced accordingly. Based on various types of stylus, touch panels and touch driving integrated circuits (ICs) also need to have corresponding matching functions.

SUMMARY

The disclosure provides a touch driving integrated circuit (IC) and an operation method thereof, so as to report posture information of an active stylus together with position information of the active stylus to a system processor.

In an embodiment of the disclosure, the touch driving IC may drive multiple touch sensing electrodes of a touch panel of a touch device. The touch driving IC includes an interface circuit, a codec, and an operation circuit. The interface circuit is configured to be coupled to the touch panel. The codec is coupled to the interface circuit and the operation circuit. Based on a control of the operation circuit, the codec sends an uplink signal to an active stylus on the touch panel through the interface circuit and the touch panel. The codec receives a downlink signal sent by the active stylus through the interface circuit and the touch panel. The codec decodes the downlink signal to obtain first posture information about a posture of the active stylus. The codec provides the first posture information of the active stylus to the operation circuit. The operation circuit reports the first posture information of the active stylus together with position information about a position of the active stylus on the touch panel to a system processor.

In an embodiment of the disclosure, the operation method includes: sending the uplink signal to the active stylus on the touch panel through the interface circuit of the touch driving IC and the touch panel by the codec of the touch driving IC based on the control of the operation circuit of the touch driving IC; receiving the downlink signal sent from the active stylus through the interface circuit and the touch panel by the codec; decoding the downlink signal by the codec to obtain the first posture information about the posture of the active stylus; providing the first posture information of the active stylus to the operation circuit by the codec; and reporting the first posture information of the active stylus together with the position information about the position of the active stylus on the touch panel to the system processor by the operation circuit.

In an embodiment of the disclosure, the touch device includes the system processor, the touch panel, and the touch driving IC. The touch panel includes the touch sensing electrodes. The touch driving IC is coupled to the system processor and the touch panel. The touch driving IC drives the touch sensing electrodes of the touch panel. The touch driving IC sends the uplink signal to the active stylus on the touch panel through the touch panel. The touch driving IC receives the downlink signal from the active stylus through the touch panel. The touch driving IC decodes the downlink signal to obtain the first posture information about the posture of the active stylus. The touch driving IC reports the first posture information of the active stylus together with the position information about the position of the active stylus on the touch panel to the system processor.

In an embodiment of the disclosure, the touch driving IC includes the interface circuit and the operation circuit. The interface circuit is configured to be coupled to the touch panel. The operation circuit is coupled to the interface circuit. The operation circuit receives the downlink signal sent by the active stylus through the interface circuit and the touch panel to generate the position information about the position of the active stylus on the touch panel. The operation circuit sends a posture providing request to the system processor to trigger the system processor to request the first posture information about the posture of the active stylus from the active stylus through a communication channel. The system processor feeds back the first posture information to the operation circuit based on the posture providing request. The operation circuit reports the first posture information of the active stylus together with the position information of the active stylus to the system processor.

In an embodiment of the disclosure, the operation method includes: receiving the downlink signal sent from the active stylus through the interface circuit of the touch driving IC and the touch panel by the operation circuit of the touch driving IC to generate the position information about the position of the active stylus on the touch panel; sending the posture providing request to the system processor by the operation circuit to trigger the system processor to request the first posture information about the posture of the active stylus from the active stylus through the communication channel, wherein the system processor feeds back the first posture information to the operation circuit based on the posture providing request; and reporting the first posture information of the active stylus together with the position information of the active stylus to the system processor by the operation circuit.

In an embodiment of the disclosure, the touch device includes a communication interface circuit, the system processor, the touch panel, and the touch driving IC. The communication interface circuit is configured to establish the communication channel to the active stylus. The system processor is coupled to the communication interface circuit. The touch panel includes the touch sensing electrodes. The touch driving IC is coupled to the system processor and the touch panel. The touch driving IC drives the touch sensing electrodes of the touch panel. The touch driving IC receives the downlink signal sent by the active stylus through the touch panel to generate the position information about the position of the active stylus on the touch panel. The touch driving IC sends the posture providing request to the system processor to trigger the system processor to request the first posture information about the posture of the active stylus from the active stylus through the communication interface circuit and the communication channel. The system processor feeds back the first posture information to the touch driving IC based on the posture providing request. The touch driving IC reports the first posture information of the active stylus together with the position information of the active stylus to the system processor.

Based on the above, the active stylus according to the embodiments of the disclosure may provide the posture information of the active stylus to the touch driving IC in real time. In some embodiments, the active stylus may send the downlink signal with the posture information to the touch panel, so the touch driving IC may receive the posture information about the posture of the active stylus through the touch panel. In other embodiments, the active stylus may send the posture information to the system processor through the communication channel, so the touch driving IC may obtain the posture information about the posture of the active stylus from the system processor. The touch driving IC may synchronize the posture information of the active stylus and the position information of the active stylus, so as to report the posture information of the active stylus together with the position information of the active stylus to the system processor.

To make the aforementioned more comprehensible, several embodiments accompanied with drawings are described in detail as follows.

DESCRIPTION OF THE EMBODIMENTS

Figure 1:
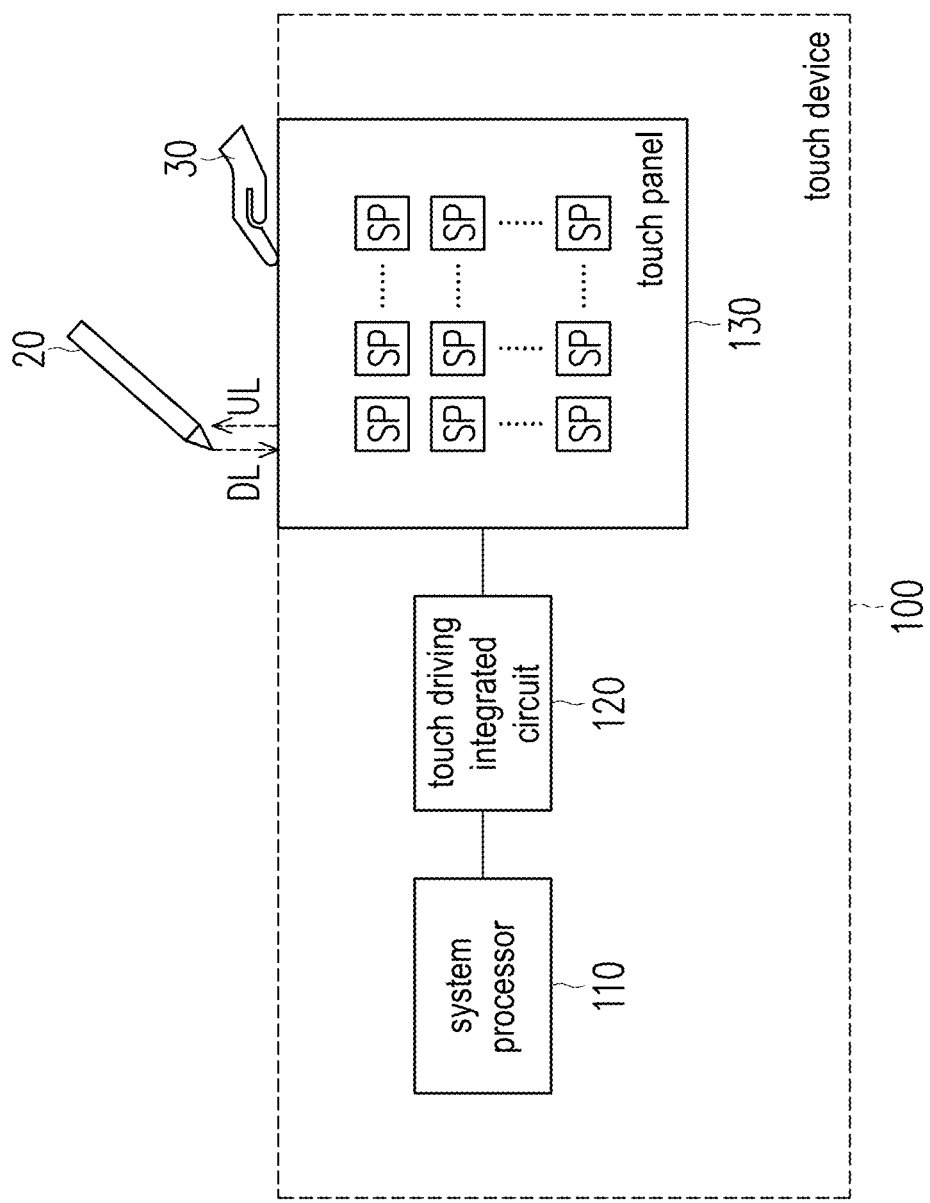
FIG. 1 is a circuit block schematic diagram of a touch device according to an embodiment of the disclosure.

A term "couple (or connected)" used in the full text of the disclosure (including the claims) refers to any direct and indirect connections. For example, if a first device is described to be coupled (or connected) to a second device, it is interpreted as that the first device is directly connected to the second device, or the first device is indirectly connected to the second device through other devices or connection means. The terms "first", "second", and the like as mentioned throughout the full text of the disclosure (including the claims) are used to name the elements or to distinguish between different embodiments or scopes, rather than setting an upper or lower limit on the number of the elements or the order of the elements. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of a touch device 100 according to an embodiment of the disclosure. The touch device 100 includes a system processor 110, a touch driving integrated circuit (IC) 120, and a touch panel 130. The touch panel 130 is configured with an electrode array having multiple touch sensing electrodes SP. The touch sensing electrode SP may be called a sensor pad. Based on a driving operation of the touch driving IC 120, thee touch sensing electrodes SP may sense touch events on the touch panel 130, such as passive object touch events and/or active object touch events. This embodiment does not limit the specific implementation of the touch panel 130. For example, based on the actual design, the touch panel 130 may be a general (well-known) touch panel or other touch panels.

The touch driving IC 120 may drive the touch sensing electrode SP of the touch panel 130 to perform a passive object detection and/or an active object detection. In the passive object detection, the touch driving IC 120 may detect a passive object 30, such as a palm or a passive stylus, through the touch panel 130. During an operation of the passive object detection, the touch driving IC 120 may provide a driving signal (such as a pulse signal) to the touch panel 130 and then read a sensing result of the touch panel 130 to determine a position of the passive object 30 on the touch panel 130.

In the active object detection, the touch driving IC 120 may detect an active object, such as an active stylus 20, through the touch panel 130. In an initial stage of the active object detection, the touch driving IC 120 may emit an uplink signal UL to the active stylus 20 through the touch panel 130 for pairing and/or other communications. During an operation of the active object detection, the active stylus 20 emits a downlink signal DL to the touch panel 130. After the touch driving IC 120 receives the downlink signal DL through the touch panel 130, the touch driving IC 120 may determine a position of the active stylus 20 on the touch panel 130. Based on an algorithm, the touch driving IC 120 may determine whether to report position information about the position of the active stylus 20 on the touch panel 130 to the system processor 110. According to different designs, in some embodiments, the touch driving IC 120 may be implemented as a hardware circuit. In other embodiments, the form of implementation of the touch driving IC 120 may be a combination of hardware, firmware, and software (i.e., program).

In terms of hardware form, the touch driving IC 120 may be implemented as a logic circuit on an IC. For example, related functions of the touch driving IC 120 may be implemented as one or more controllers, microcontrollers, microprocessors, application-specific ICs (ASIC), digital signal processors (DSP), field programmable gate arrays (FPGA), central processing units (CPU) and/or various types of logic blocks, modules, and circuits in other processing units. The related functions of the touch driving IC 120 may be implemented as hardware circuits, such as various logic blocks, modules, and circuits in the IC, using hardware description languages (such as Verilog HDL or VHDL) or other suitable programming languages.

In terms of software form and/or firmware form, the related functions of the touch driving IC 120 may be implemented as programming codes. For example, general programming languages (such as C, C or combination language) or other suitable programming languages are used to implement the touch driving IC 120. The programming code may be recorded/stored in "a non-transitory machine-readable storage medium". In some embodiments, the non-transitory machine-readable storage medium includes, for example, a semiconductor memory and/or a storage device. The electronic device (such as the CPU, the controller, the microcontroller, or the microprocessor) may read and execute the programming code from the non-transitory machine-readable storage medium, thereby realizing the related functions of the touch driving IC 120.

Figure 2:
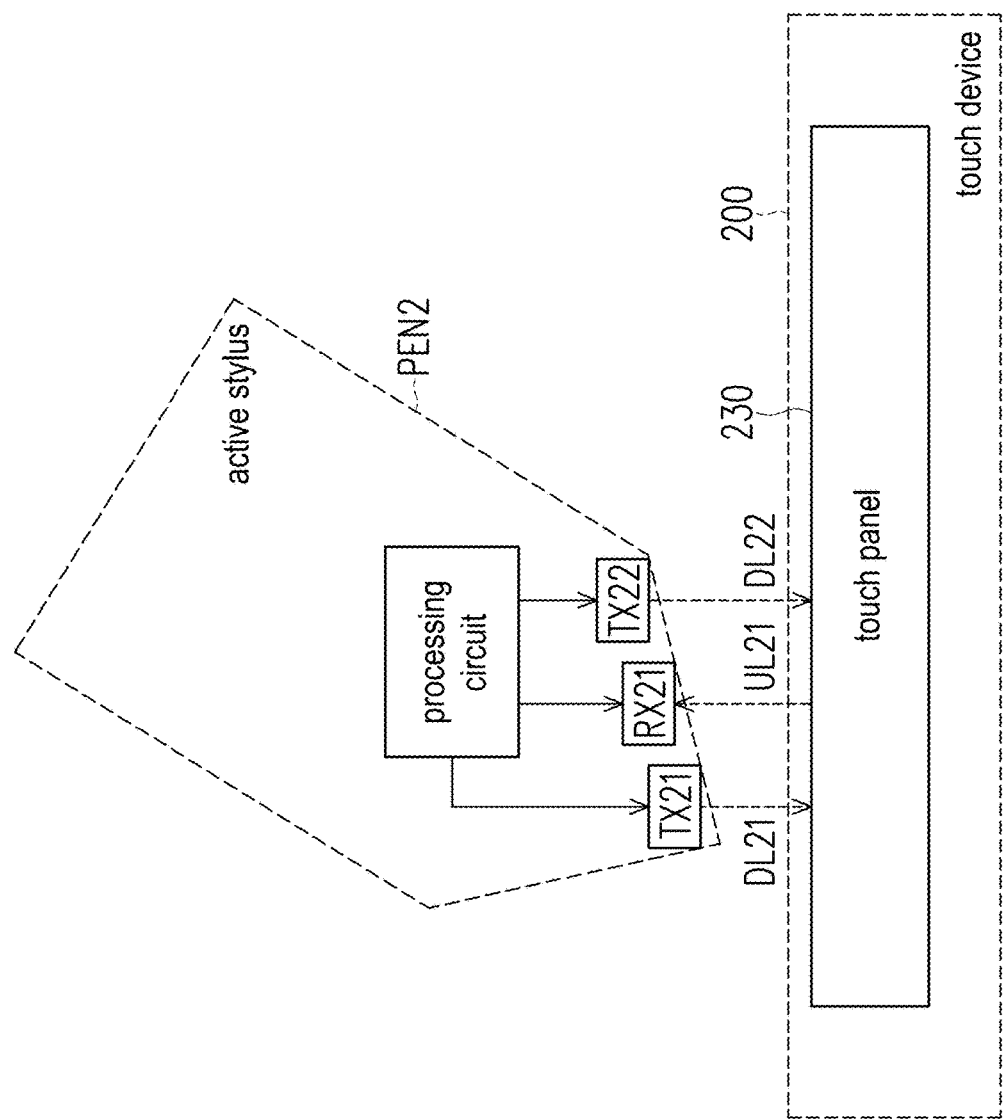
FIG. 2 is a schematic diagram of an operation situation of an active stylus and a touch panel according to an embodiment.

FIG. 2 is a schematic diagram of an operation situation of an active stylus PEN2 and a touch panel 230 according to an embodiment. The active stylus PEN2, a touch device 200, and the touch panel 230 shown in FIG. 2 may be referred to the relevant description of the active stylus 20, the touch device 100, and the touch panel 130 shown in FIG. 1. In the operation situation shown in FIG. 2, a touch sensing electrode (not shown in FIG. 2) of the touch panel 230 emits an uplink signal UL21 to a receiver electrode RX21 of the active stylus PEN2 for pairing. After successful pairing, the active stylus PEN2 emits a downlink signal DL21 through a transmitter electrode TX21 to the touch panel 230 for touch positioning. In order to realize a pen posture determination, the active stylus PEN2 also needs to emit a downlink signal DL22 to the touch panel 230 through a transmitter electrode TX22. Based on the different postures of the active stylus PEN2, a distance between the transmitter electrode TX21 and the touch panel 230 is often different from a distance between the transmitter electrode TX22 and the touch panel 230, thereby causing the touch panel 230 to sense that an intensity of the downlink signal DL22 is different from an intensity of the downlink signal DL21. The touch device 200 may determine the posture (a tilt angle) of the active stylus PEN2 based on the intensity difference of the downlink signals DL21 and DL22. Alternately, based on the different postures of the active stylus PEN2, the position of the transmitter electrode TX21 on the touch panel 230 is different from the position of the transmitter electrode TX22 on the touch panel 230. The touch device 200 may detect the positions (the distance) of the transmitter electrodes TX21 and TX22 based on the downlink signals DL21 and DL22, thereby determining the posture (the tilt angle) of the active stylus PEN2.

Using two transmitter electrodes TX21 and TX22 to determine the pen posture may have issues with accuracy and being easily interfered by environmental factors. For example, in response to one of the two transmitter electrodes TX21 and TX22 of the active stylus PEN2 being located at an edge of the touch panel 230, or one or both of the transmitter electrodes TX21 and TX22 being covered by a hand (that is, one or both of the downlink signal DL21 and DL22 are interfered by the hand), or other interference signals in the environment interfering one or both of the downlink signals DL21 and DL22, the accuracy of the touch device 200 in calculating the pen posture is affected. In the embodiment shown in FIG. 2 "using the two transmitter electrodes TX21 and TX22 of the active stylus PEN2 to determine the pen posture", since the downlink signals DL21 and DL22 are easily affected by the environment, it is difficult to improve stability and accuracy of determining the pen tilt angle.

In addition, in order to prevent the electrode signal from being interfered by the hand when holding the active stylus PEN2, the receiver electrode RX21, the transmitter electrode TX21, and the transmitter electrode TX22 are generally arranged at a pen tip of the active stylus PEN2. An area of the pen tip is limited. The sizes of the receiver electrode RX21 and the transmitter electrode TX21 need to be reduced so that the pen tip may accommodate the additional transmitter electrode TX22. A reduction in an electrode size means that the ability to receive/transmit signals is weakened and the ability to resist environmental noise is reduced. The following embodiments illustrate how the touch driving IC realizes the posture detection of the active stylus without adding an additional transmitting electrode TX22.

Figure 3:
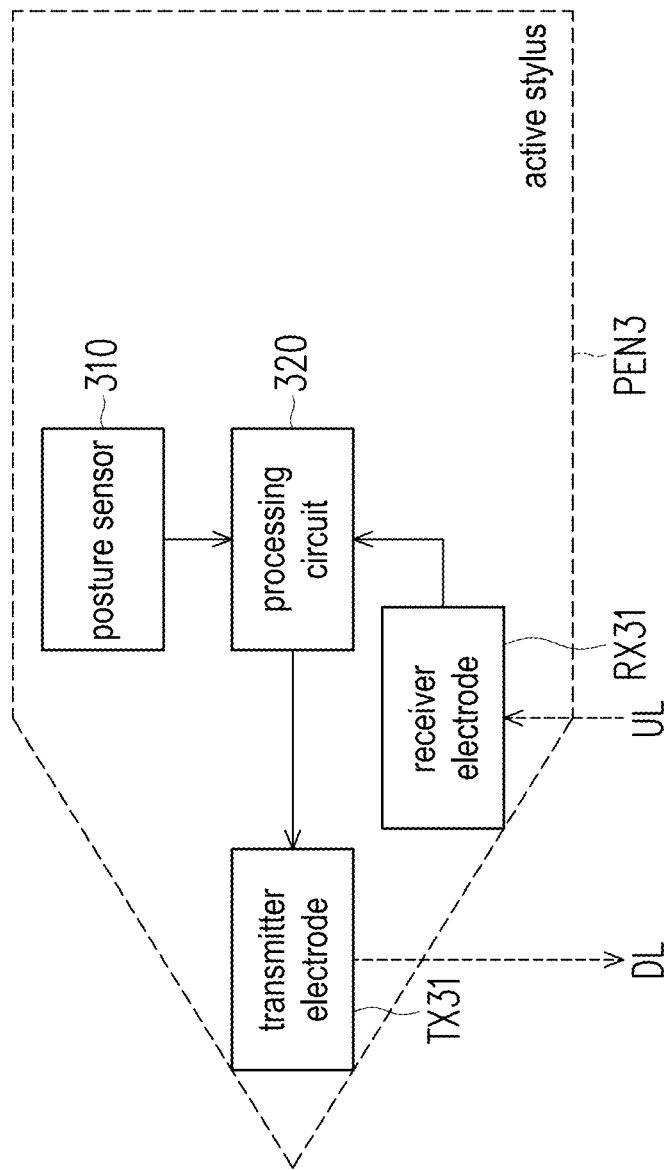
FIG. 3 is a circuit block diagram of an active stylus according to an embodiment of the disclosure.

FIG. 3 is a circuit block diagram of an active stylus PEN3 according to an embodiment of the disclosure. The active stylus PEN3 shown in FIG. 3 may refer to the relevant description of the active stylus 20 shown in FIG. 1. The active stylus PEN3 shown in FIG. 3 may be used as one of many embodiments of the active stylus 20 shown in FIG. 1. In the embodiment shown in FIG. 3, the active stylus PEN3 includes a posture sensor 310, a processing circuit 320, a receiver electrode RX31, and a transmitter electrode TX31. The receiver electrode RX31 and the transmitter electrode TX31 shown in FIG. 3 may be deduced by referring to the relevant description of the receiver electrode RX21 and the transmitter electrode TX21 shown in FIG. 1, and therefore is not repeated herein.

Based on the actual design, the posture sensor 310 may include an inertial measurement unit (IMU) or other sensors. The posture sensor 310 may measure a three-axis posture angle (or an angular rate) and an acceleration of the active stylus PEN3. The processing circuit 320 is coupled to the posture sensor 310 to receive the sensing result. The processing circuit 320 may encode the sensing result of the posture sensor 310 (the posture information about the posture of the active stylus PEN3) into the downlink signal DL, and then send the downlink signal DL to the touch panel (not shown in FIG. 3, for example, the touch panel 130 shown in FIG. 1) through the transmitter electrode TX31.

To sum up, by utilizing a posture sensing ability of the posture sensor 310, the active stylus PEN3 may provide the posture information of the active stylus PEN3 to the touch device. Therefore, the active stylus PEN3 shown in FIG. 3 does not need a dual-electrode structure (the transmitter electrodes TX21 and TX22) of the active stylus PEN2 shown in FIG. 2 to avoid environmental influences on the stability and the accuracy of determining the pen tilt angle. In addition, since the active stylus PEN3 shown in FIG. 3 omits the additional transmitter electrode TX22 shown in FIG. 2, the size of the receiver electrode RX31 and the transmitter electrode TX31 arranged at the pen tip of the active stylus PEN3 may be increased as much as possible. Compared with the embodiment shown in FIG. 2, the size of the receiver electrode RX31 and the transmitter electrode TX31 of the active stylus PEN3 shown in FIG. 3 is enlarged, so the ability of the active stylus PEN3 to receive/transmit signals and resist the environmental noise may be effectively improved.

Referring to FIGS. 1 and 3, the touch driving IC 120 is coupled to the system processor 110 and the touch panel 130. The touch driving IC 120 drives the touch sensing electrode SP of the touch panel 130. The touch driving IC 120 sends the uplink signal UL to the active stylus 20 (the active stylus PEN3) on the touch panel 130 through the touch panel 130. The touch driving IC 120 receives the downlink signal DL sent by the active stylus 20 through the touch panel 130. The touch driving IC 120 decodes the downlink signal DL carrying posture information about the posture of the active stylus 20 to obtain the posture information of the active stylus 20. The touch driving IC 120 reports the posture information of the active stylus 20 together with the position information about the position of the active stylus 20 on the touch panel 130 to the system processor 110.

Figure 4:
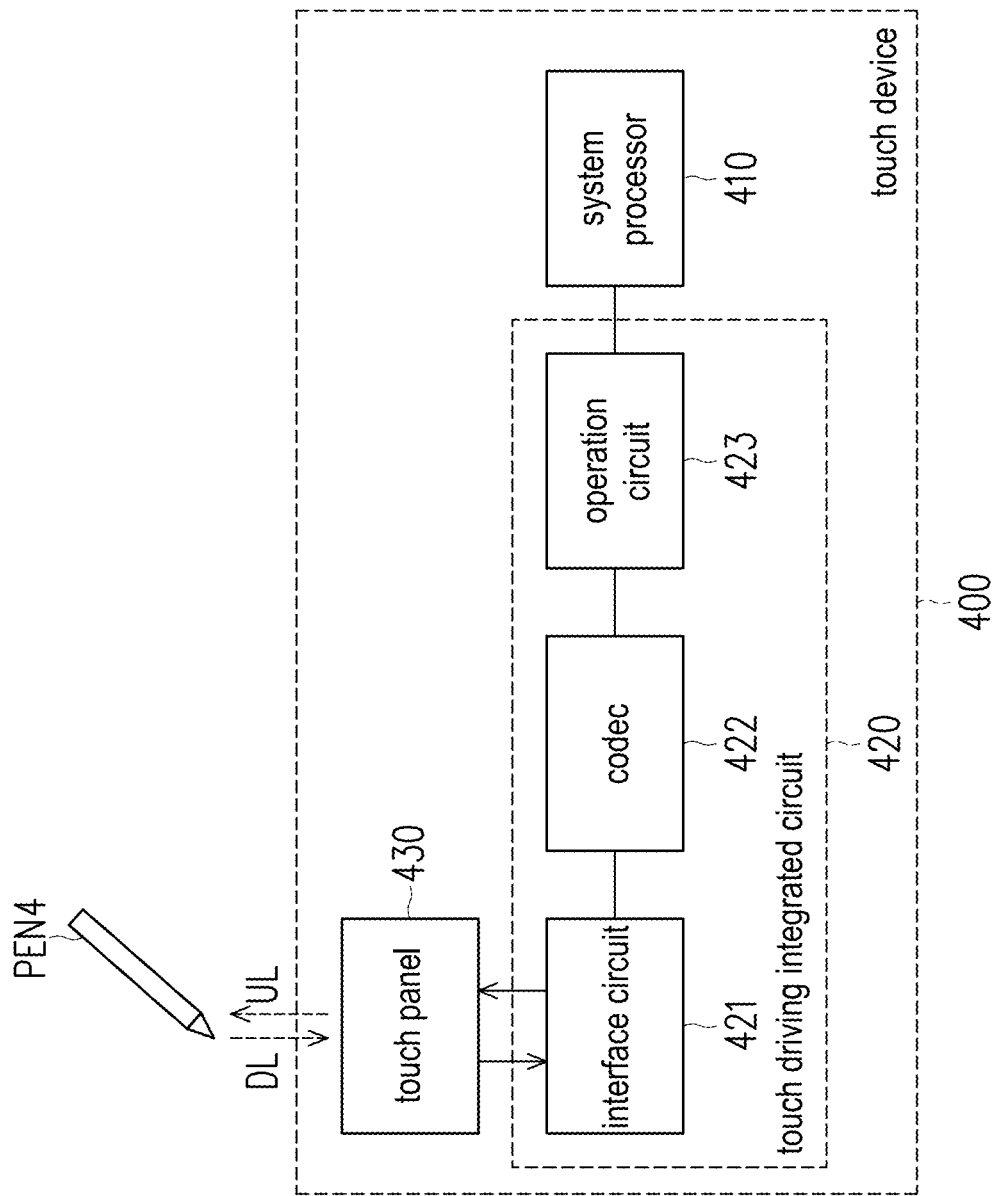
FIG. 4 is a circuit block diagram of a touch driving integrated circuit (IC) according to an embodiment of the disclosure.

FIG. 4 is a circuit block diagram of a touch driving IC 420 according to an embodiment of the disclosure. An active stylus PEN4, a touch device 400, a system processor 410, the touch driving IC 420, and a touch panel 430 shown in FIG. 4 may be deduced by referring to the relevant description of the active stylus 20, the touch device 100, and the system processor 110 in FIG. 1. The touch driving IC 420 shown in FIG. 4 may be used as one of many embodiments of the touch driving IC 120 shown in FIG. 1. In the embodiment shown in FIG. 4, the touch driving IC 420 includes an interface circuit 421, a codec 422, and an operation circuit 423. The interface circuit 421 is used to be coupled to the touch panel 430. The codec 422 is coupled to the interface circuit 421 and the operation circuit 423.

Figure 5:
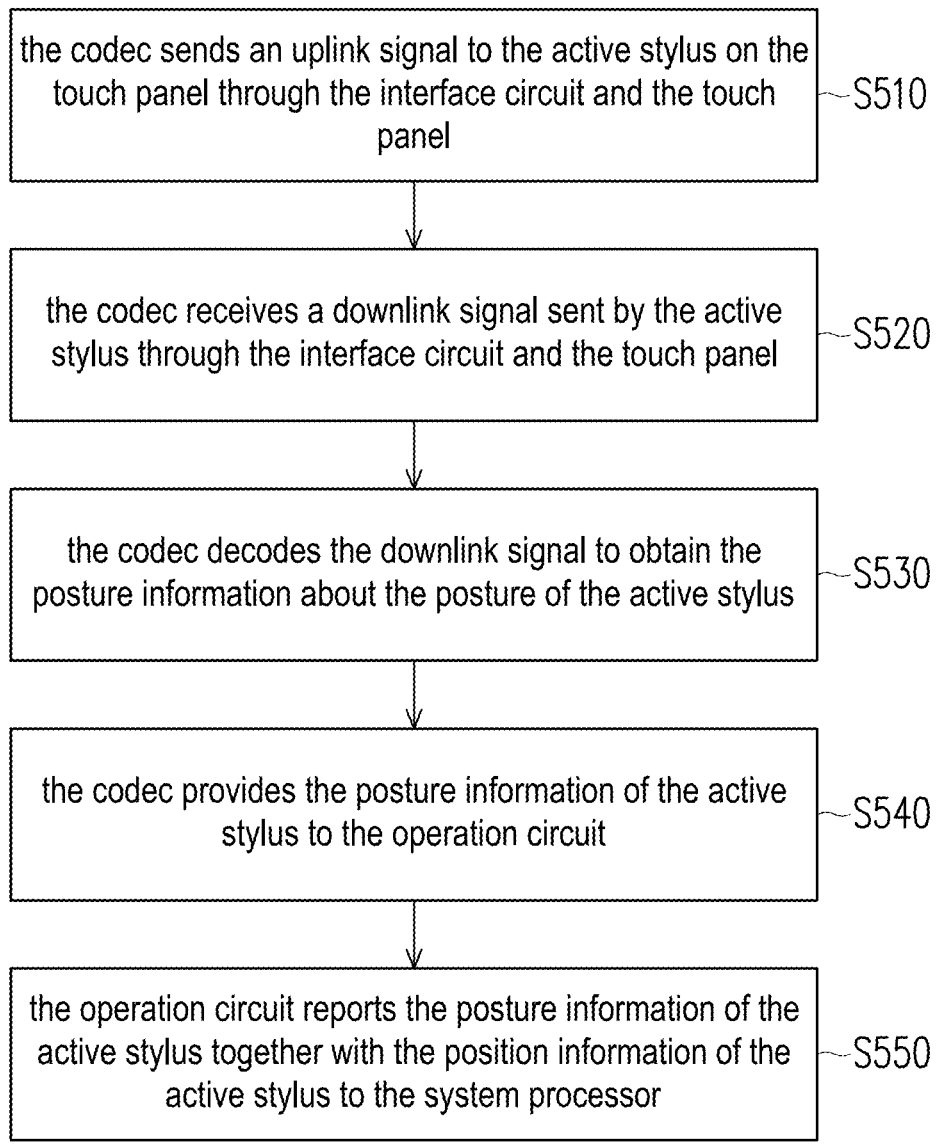
FIG. 5 is a schematic flowchart of an operation method of a touch driving IC according to an embodiment of the disclosure.

FIG. 5 is a schematic flowchart of an operation method of a touch driving IC according to an embodiment of the disclosure. Referring to FIGS. 4 and 5, in step S510, based on a control of the operation circuit 423, the codec 422 sends the uplink signal UL to the active stylus PEN4 on the touch panel 430 through the interface circuit 421 and the touch panel 430. For example, the operation circuit 423 may send the uplink signal UL with a tilt angle providing request to the active stylus PEN4 through the codec 422, the interface circuit 421, and the touch panel 430, so as to trigger the active stylus PEN4 to send the downlink signal DL with the posture information to the touch panel.

In step S520, the codec 422 receives the downlink signal DL sent by the active stylus PEN4 through the interface circuit 421 and the touch panel 430. In step S530, the codec 422 decodes the downlink signal DL to obtain the posture information about the posture of the active stylus PEN4. In step S540, the codec 422 provides the posture information of the active stylus PEN4 to the operation circuit 423. In step S550, the operation circuit 423 reports the posture information of the active stylus PEN4 together with the position information about the position of the active stylus PEN4 on the touch panel 430 to the system processor 410.

To sum up, the active stylus PEN4 may provide the posture information of the active stylus PEN4 to the touch driving IC 420 in real time. For example, the active stylus PEN4 may send a downlink signal DL with the posture information to the touch panel 430, so the touch driving IC 420 may receive the posture information about the posture of the active stylus PEN4 through the touch panel 430. The touch driving IC 420 may synchronize the posture information of the active stylus PEN4 and the position information of the active stylus PEN4, so as to report the posture information of the active stylus PEN4 together with the position information of the active stylus PEN4 to the system processor 410.

Figure 6:
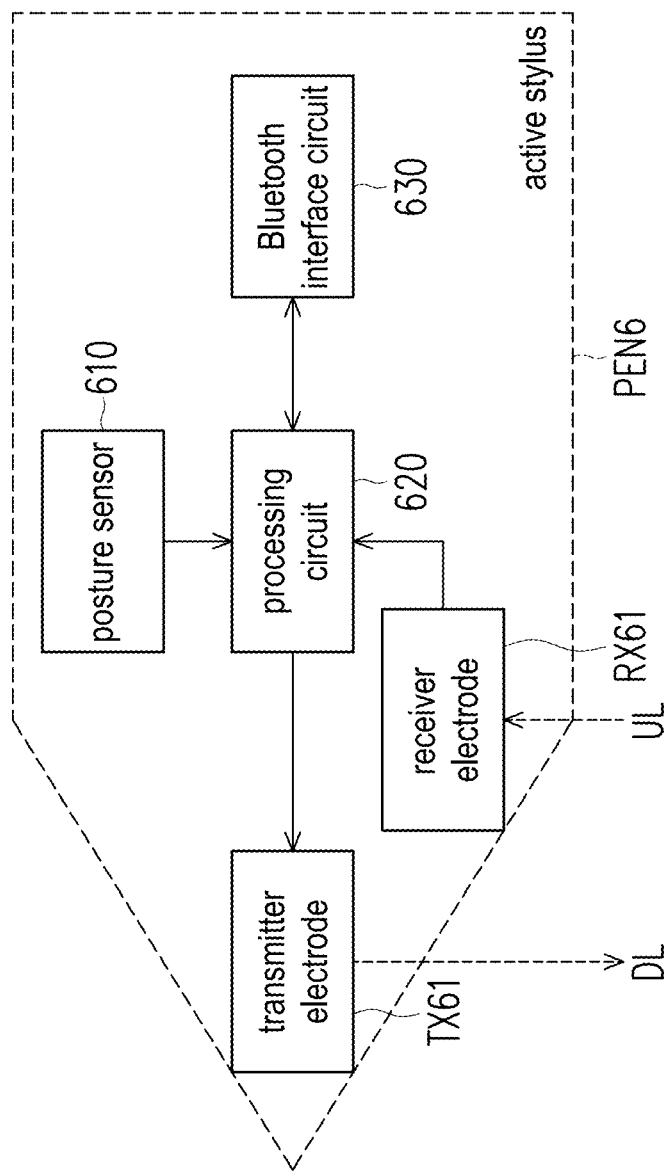
FIG. 6 is a circuit block diagram of an active stylus according to another embodiment of the disclosure.

FIG. 6 is a circuit block diagram of an active stylus PEN6 according to another embodiment of the disclosure. The active stylus PEN6 shown in FIG. 6 may refer to the relevant description of the active stylus 20 shown in FIG. 1. The active stylus PEN6 shown in FIG. 6 may be used as one of many embodiments of the active stylus 20 shown in FIG. 1. In the embodiment shown in FIG. 6, the active stylus PEN6 includes a posture sensor 610, a processing circuit 620, a communication interface circuit (such as Bluetooth interface circuit 630 or other communication interface circuit), a receiver electrode RX61, and a transmitter electrode TX61. The receiver electrode RX61 and the transmitter electrode TX61 shown in FIG. 6 may be deduced by referring to the relevant description of the receiver electrode RX21 and the transmitter electrode TX21 shown in FIG. 2. The posture sensor 610, the processing circuit 620, the receiver electrode RX61, and the transmitter electrode TX61 may be deduced by referring to the relevant description of the posture sensor 310, the processing circuit 320, the receiver electrode RX31, and the transmitter electrode TX31 shown in FIG. 3, and therefore is not repeated herein.

In the embodiment shown in FIG. 6, the communication interface circuit of the active stylus PEN6 may establish a communication channel to a touch device (not shown in FIG. 6, such as the touch device 100 shown in FIG. 1). For example, the Bluetooth interface circuit 630 may establish a Bluetooth channel to a touch device (such as the touch device 100 shown in FIG. 1). The processing circuit 620 may encode the sensing result of the posture sensor 610 (the posture information about the posture of the active stylus PEN6) into a Bluetooth signal packet, and then send the Bluetooth signal packet through the Bluetooth interface circuit 630 and the Bluetooth channel to the touch device.

Figure 7:
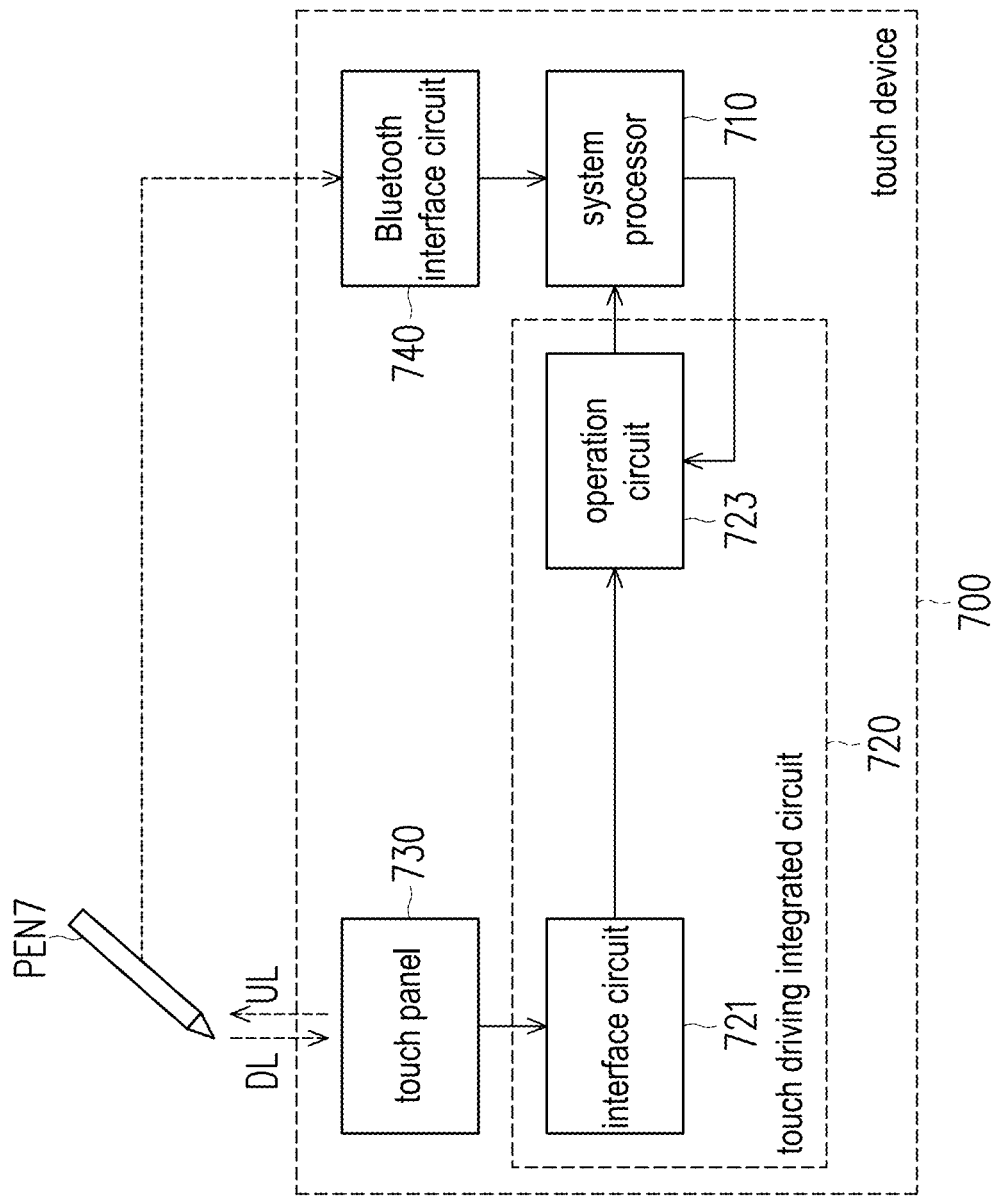
FIG. 7 is a circuit block diagram of a touch driving IC according to another embodiment of the disclosure.

FIG. 7 is a circuit block diagram of a touch driving IC 720 according to another embodiment of the disclosure. In the embodiment shown in FIG. 7, the touch device 700 includes a system processor 710, the touch driving IC 720, a touch panel 730, and a communication interface circuit (such as Bluetooth interface circuit 740 or other communication interface circuit). The active stylus PEN7, the touch device 700, the system processor 710, the touch driving IC 720, and the touch panel 730 shown in FIG. 7 may be deduced by referring to the relevant description of the active stylus 20, the touch device 100, the system processor 110, the touch driving IC 120, and the touch panel 130.

Referring to FIGS. 6 and 7, the communication interface circuit of the touch device 700 may establish a communication channel to a communication interface circuit of an active stylus. For example, the Bluetooth interface circuit 740 is used to establish the Bluetooth channel to the active stylus PEN7 (the Bluetooth interface circuit 630 of the active stylus PEN6). The system processor 710 is coupled to the Bluetooth interface circuit 740. The touch driving IC 720 is coupled to the system processor 710 and the touch panel 730. The touch driving IC 720 drives the touch sensing electrode of the touch panel 730. The touch driving IC 720 receives the downlink signal DL sent by the active stylus PEN7 through the touch panel 730 to generate the position information about the position of the active stylus PEN7 on the touch panel 730. The touch driving IC 720 sends a posture providing request to the system processor 710 to trigger the system processor 710 to request the posture information about the posture of the active stylus PEN7 from the active stylus PEN7 through the Bluetooth interface circuit 740 and the Bluetooth channel. The system processor 710 feeds back the posture information of the active stylus PEN7 to the touch driving IC 720 based on the posture providing request. The touch driving IC 720 reports the posture information of the active stylus PEN7 together with the position information of the active stylus PEN7 to the system processor 710.

The touch driving IC 720 shown in FIG. 7 may be used as one of many embodiments of the touch driving IC 120 shown in FIG. 1. In the embodiment shown in FIG. 7, the touch driving IC 720 includes an interface circuit 721 and an operation circuit 723. The interface circuit 721 is used to couple to the touch panel 730. The interface circuit 721 is coupled to the operation circuit 723.

Figure 8:
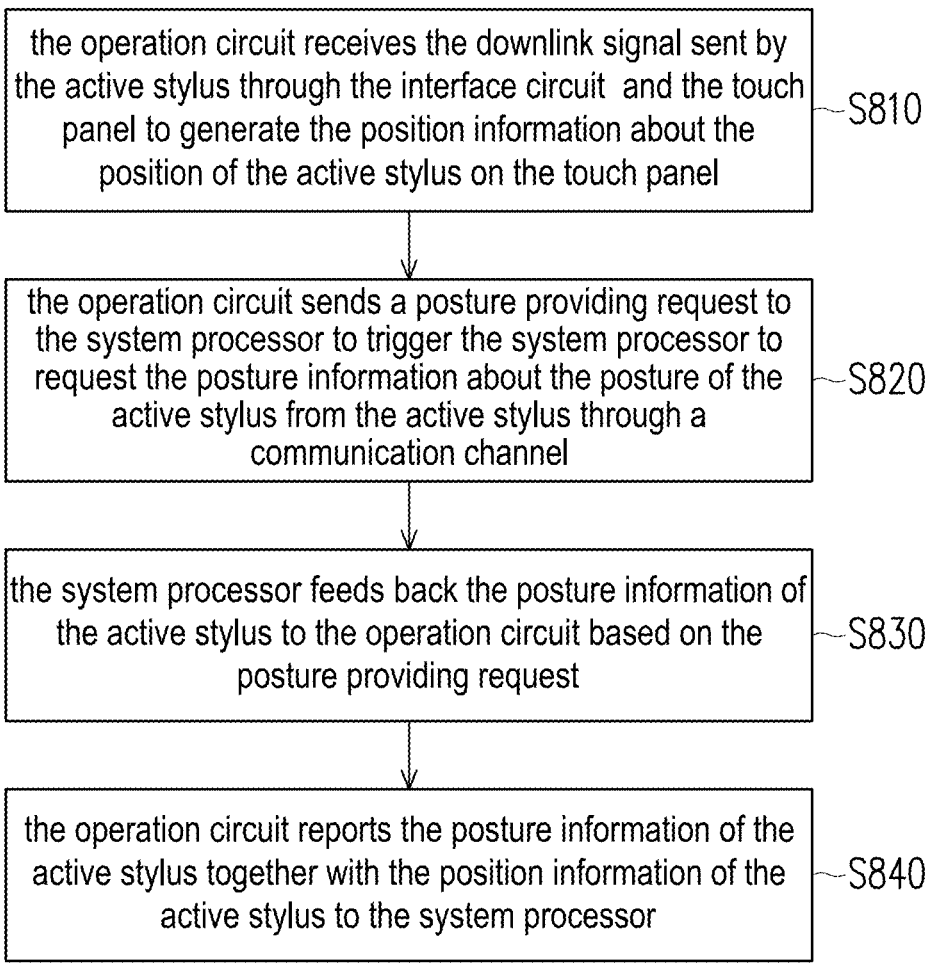
FIG. 8 is a schematic flowchart of an operation method of a touch driving IC according to another embodiment of the disclosure.

FIG. 8 is a schematic flowchart of an operation method of a touch driving IC according to another embodiment of the disclosure. Referring to FIGS. 7 and 8, in step S810, the operation circuit 723 receives the downlink signal DL sent by the active stylus PEN7 through the interface circuit 721 and the touch panel 730 to generate the position information about the position of the active stylus PEN7 on the touch panel 730. In step S820, the operation circuit 723 sends the posture providing request to the system processor 710 to trigger the system processor 710 to request the posture information about the posture of the active stylus PEN7 from the active stylus PEN7 through a communication channel (such as the Bluetooth channel). In step S830, the system processor 710 feeds back the posture information of the active stylus PEN7 to the operation circuit 723 based on the posture providing request. The operation circuit 723 calculates the posture information of the active stylus PEN7 provided by the system processor 710 to obtain tilt angle information of the active stylus PEN7. In step S840, the operation circuit 723 reports the posture information (the tilt angle information) of the active stylus PEN7 together with the position information of the active stylus PEN7 to the system processor 710.

To sum up, the active stylus PEN7 may provide the posture information of the active stylus PEN7 to the touch driving IC 720 in real time. For example, the active stylus PEN7 may send the posture information to the system processor 710 through a communication channel (such as the Bluetooth channel), so the touch driving IC 720 may obtain the posture information about the posture of the active stylus PEN7 from the system processor 710. The touch driving IC 720 may synchronize the posture information of the active stylus PEN7 and the position information of the active stylus PEN7, so as to report the posture information (the tile angle information) of the active stylus PEN7 together with the position information of the active stylus PEN7 to the system processor 710.

Figure 9:
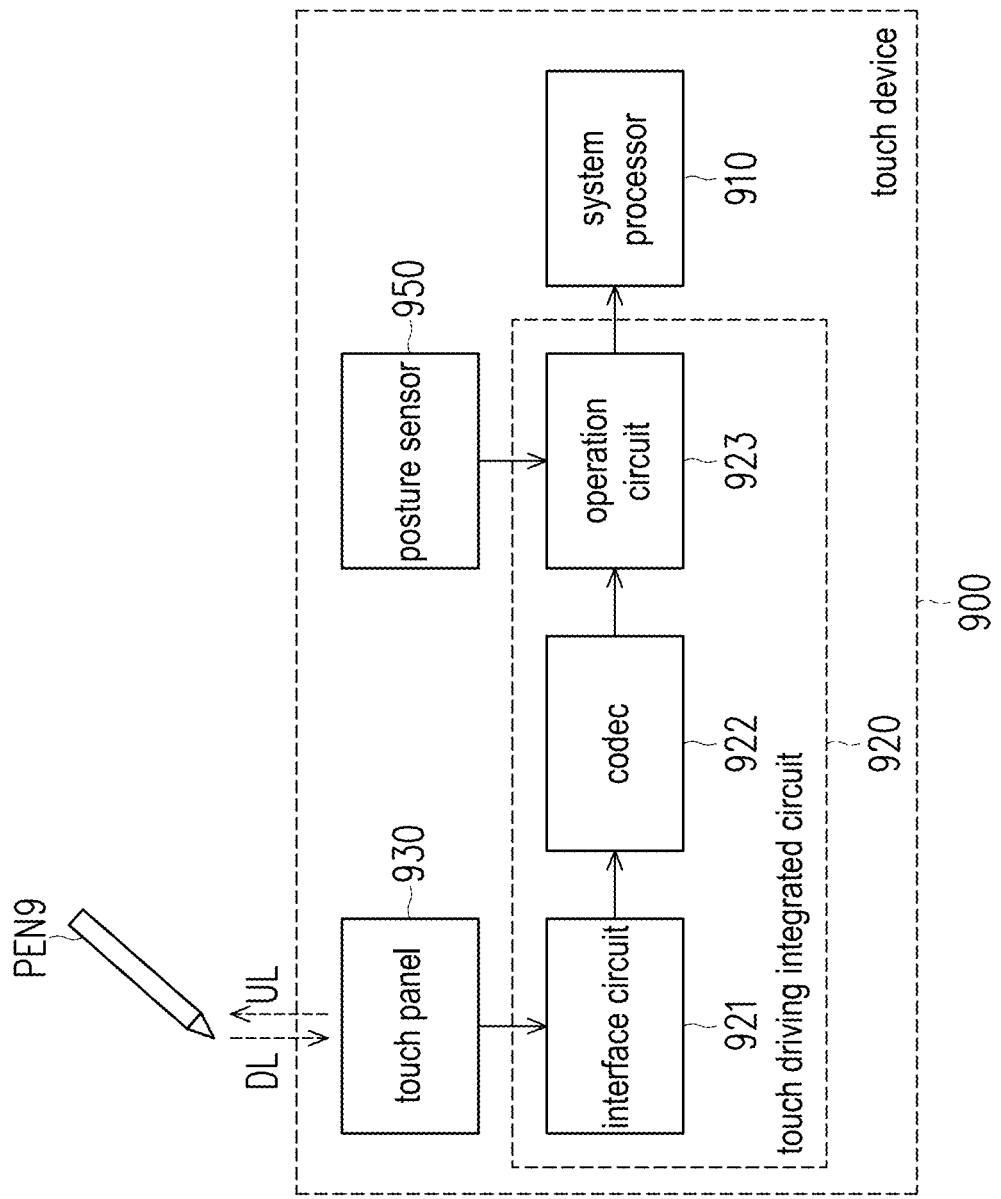
FIG. 9 is a circuit block diagram of a touch driving IC according to another embodiment of the disclosure.

FIG. 9 is a circuit block diagram of a touch driving IC 920 according to another embodiment of the disclosure. In the embodiment shown in FIG. 9, the touch device 900 includes a system processor 910, the touch driving IC 920, a touch panel 930, and a posture sensor 950. An active stylus PEN9, the touch device 900, the system processor 910, the touch driving IC 920, and the touch panel 930 shown in FIG. 9 may be deduced by referring to the relevant description of the active stylus 20, the touch device 100, the system processor 110, the touch driving IC 120, and the touch panel 130.

In the embodiment shown in FIG. 9, the touch driving IC 920 includes an interface circuit 921, a codec 922, and an operation circuit 923. The interface circuit 921, the codec 922, and the operation circuit 923 shown in FIG. 9 may be deduced by referring to the relevant description of the interface circuit 421, the codec 422, and the operation circuit 423 shown in FIG. 4, and therefore is not repeated herein. The operation circuit 923 is coupled to the posture sensor 950 to receive the sensing result. In other embodiments, the touch device 700 shown in FIG. 7 may also selectively arrange the posture sensor 950 as shown in FIG. 9 based on the actual design.

In the embodiment shown in FIG. 9, the posture sensor 950 may include the inertial measurement unit (IMU) or other sensors. The posture sensor 950 may measure the three-axis posture angle (or the angular rate) and an acceleration of the touch device 900. The operation circuit 923 may obtain posture information (second posture information) about the posture of the touch device 900 from the posture sensor 950. In addition, the operation circuit 923 may obtain the posture information (the first posture information) of the active stylus PEN9 through the codec 922, the interface circuit 921, and the touch panel 930. The operation circuit 923 may determine a relative tilt angle of the active stylus PEN9 relative to the touch panel 930 based on the second posture information of the touch device 900 and the first posture information of the active stylus PEN9.

Figure 10:
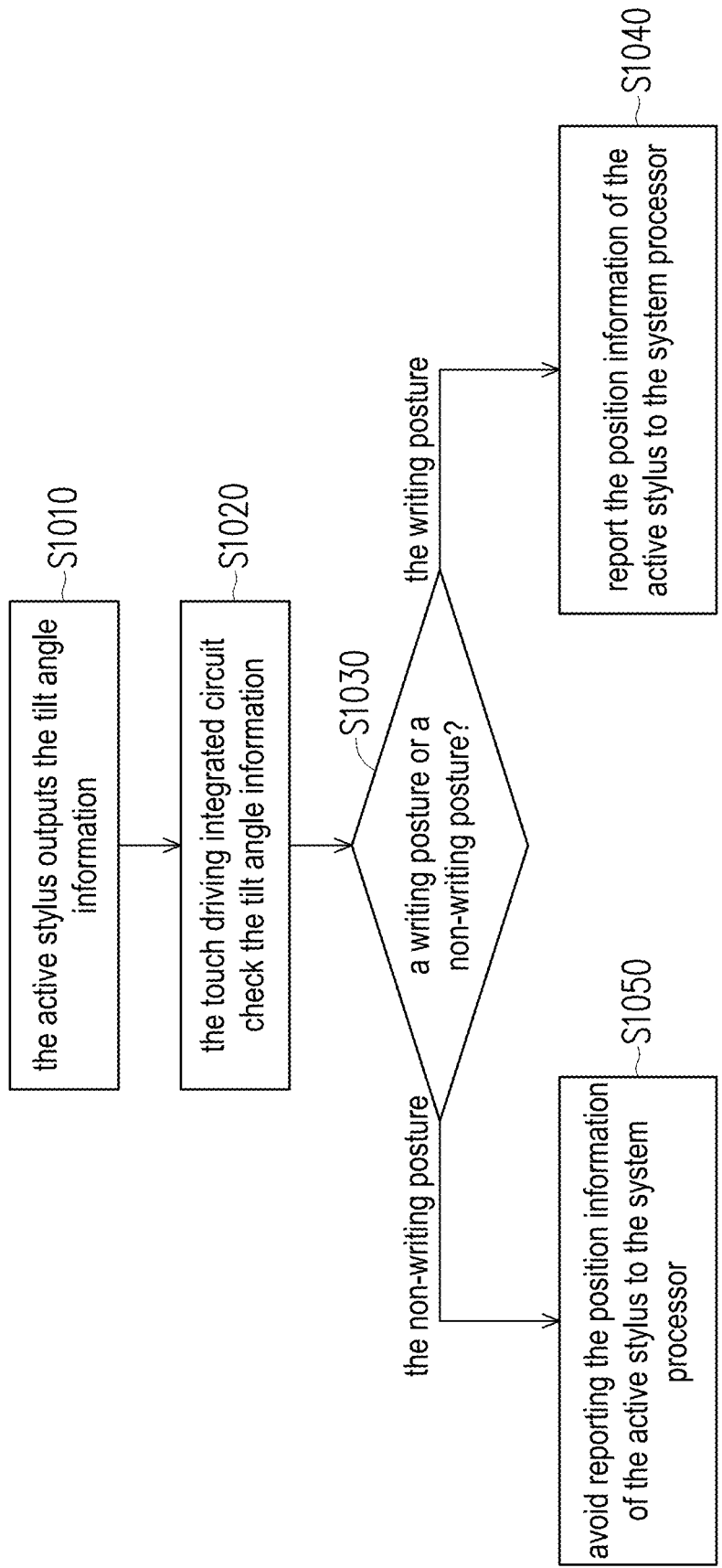
FIG. 10 is a schematic flowchart of an operation method of a touch driving IC according to another embodiment of the disclosure.

FIG. 10 is a schematic flowchart of an operation method of a touch driving IC according to another embodiment of the disclosure. Referring to FIG. 1 and FIG. 10, in step S1010, the active stylus 20 may provide the tilt angle information (the posture information) of the active stylus 20 to the touch driving IC 120 in real time. In some embodiments, the active stylus 20 may send the tilt angle information of the active stylus 20 to the touch panel 130 through the downlink signal DL, so the touch driving IC 120 may receive the tilt angle information of the active stylus 20 through the touch panel 130. In other embodiments, the active stylus 20 may send the posture information to the system processor 110 through a communication channel (such as the Bluetooth channel), so the touch driving IC 120 may obtain the tilt angle information about the active stylus 20 from the system processor 110.

In step S1020, the touch driving IC 120 may check the tilt angle information (the posture information) of the active stylus 20. In step S1030, the operation circuit of the touch driving IC 120 may determine whether the active stylus 20 is currently in a writing posture or a non-writing posture based on the tilt angle information (the posture information) of the active stylus 20. When the tilt angle information of the active stylus 20 indicates that the tilt angle of the active stylus 20 (the angle between a long axis of the active stylus 20 and a normal line of the touch panel 130) is less than a threshold value, the touch driving IC 120 may determine that the active stylus 20 is currently in the writing posture (the determination result in the step S1030 is "the writing posture"). The threshold value may be any real number determined according to actual design.

In response to the active stylus 20 currently being in the writing posture, the operation circuit of the touch driving IC 120 may perform a normal processing about the active stylus 20 to calculate the position information of the active stylus 20 (coordinates on the touch panel 130). This embodiment does not limit the specific content of the normal processing. For example, the touch driving IC 120 may execute a well-known active stylus positioning/tracking algorithm or other algorithms to implement the normal processing about the active stylus 20. The touch driving IC 120 reports the position information of the active stylus 20 (the coordinates on the touch panel 130) to the system processor 110 (step S1040).

The embodiment shown in FIG. 10 may achieve "no point reporting when the pen is placed flat". In the user operation situation, the user may hope that when the active stylus 10 is placed flat on the touch panel 130, the active stylus 10 does not leak ink on the touch panel 130, just like a normal ball pen or pencil placed flat on the paper. When the tilt angle information of the active stylus 20 indicates that the tilt angle of the active stylus 20 is greater than the threshold value, the touch driving IC 120 may determine that the active stylus 20 is currently in the non-writing posture (the determination result in the step S1030 is "the non-writing posture"). In response to the active stylus 20 currently being in the non-writing posture, the operation circuit of the touch driving IC 120 may ignore the normal processing about the active stylus 20 (e.g., ignore/stop all calculations about the active stylus 20) to avoid reporting the position information of the active stylus 20 (the coordinates on the touch panel 130) to the system processor 110 (step S1050), thereby preventing the ink leakage of the active stylus 10 on the touch panel 130.

Figure 11:
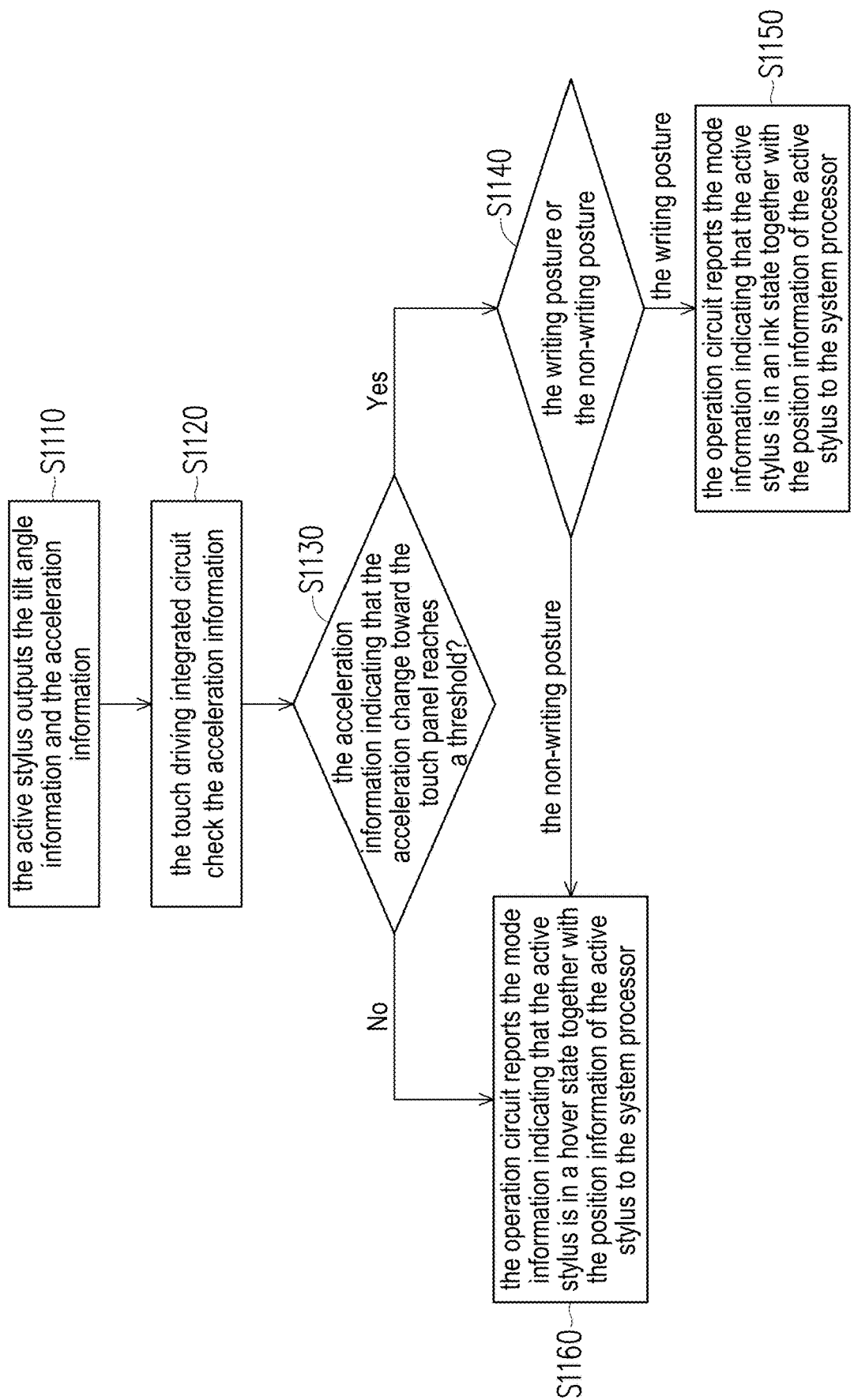
FIG. 11 is a schematic flowchart of an operation method of a touch driving IC according to yet another embodiment of the disclosure.

FIG. 11 is a schematic flowchart of an operation method of a touch driving IC according to yet another embodiment of the disclosure. Referring to FIG. 1 and FIG. 11, in step S1110, the active stylus 20 may provide the tilt angle information (the posture information) and the acceleration information of the active stylus 20 to the touch driving IC 120 in real time. In some embodiments, the active stylus 20 may send the tilt angle information and acceleration information of the active stylus 20 to the touch panel 130 through the downlink signal DL, so the touch driving IC 120 may receive the tilt angle information and the acceleration information of the active stylus 20 through the touch panel 130. In other embodiments, the active stylus 20 may send the posture information and the acceleration information to the system processor 110 through a communication channel (such as the Bluetooth channel or other communication channel), so the touch driving IC 120 may obtain the tilt angle information and the acceleration information about the active stylus 20 from the system processor 110.

The codec of the touch driving IC 120 may decode the downlink signal DL to obtain the tilt angle information (the posture information) and the acceleration information of the active stylus 20. In step S1120, the touch driving IC 120 may check the acceleration information of the active stylus 20. In response to the acceleration information of the active stylus 20 indicating that the acceleration change of the active stylus 20 toward the touch panel 130 reaches a threshold (the determination result of step S1130 is "Yes"), the operation circuit of the touch driving IC 120 perform step S1140 to check the tilt angle information (the posture information) of the active stylus 20. The threshold can be determined according to actual design.

In the step S1140, the operation circuit of the touch driving IC 120 may determine whether the active stylus 20 is currently in the writing posture or the non-writing posture based on the tile angle information (the posture information) of the active stylus 20. When the tilt angle information of the active stylus 20 indicates that the tilt angle of the active stylus 20 (the angle between the long axis of the active stylus 20 and the normal line of the touch panel 130) is less than the threshold value, the touch driving IC 120 may determine that the active stylus 20 is currently in the writing posture (the determination result in the step S1140 is "the writing posture"). The threshold value may be any real number determined according to actual design.

In response to the acceleration information indicating that the acceleration change of the active stylus 20 reaches the threshold and the active stylus 20 currently being in the writing posture, the operation circuit of the touch driving IC 120 may report mode information indicating that "the active stylus is in an ink state" together with the position information of the active stylus 20 (the coordinates on the touch panel 130) to the system processor 110 (step S1150). In response to the acceleration information of the active stylus 20 indicating that the acceleration change of the active stylus 20 toward the touch panel 130 does not reach the threshold (the determination result of the step S1130 is "No"), or in response to the active stylus 20 currently being in the non-writing posture (the determination result of the step S1140 is "the non-writing posture"), the operation circuit of the touch driving IC 120 report the mode information indicating that "the active stylus 20 is in a hover state" together with the position information of the active stylus 20 (the coordinates on the touch panel 130) to the system processor 110 (step S1160).

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A touch driving integrated circuit configured to drive a plurality of touch sensing electrodes of a touch panel, wherein the touch driving integrated circuit comprises:
   an operation circuit;
   an interface circuit configured to be coupled to the touch panel; and
   a codec coupled to the interface circuit and the operation circuit, wherein the codec sends an uplink signal to an active stylus on the touch panel through the interface circuit and the touch panel based on the control of the operation circuit, the codec receives a downlink signal sent from the active stylus through the interface circuit and the touch panel, the codec decodes the downlink signal to obtain first posture information about a posture of the active stylus, the codec provides the first posture information of the active stylus to the operation circuit, and the operation circuit reports position information about a position of the active stylus on the touch panel together with the first posture information of the active stylus to a system processor;
   wherein a posture sensor, the touch driving integrated circuit, and the touch panel are disposed in a touch device, the operation circuit obtains second posture information about the posture of the touch device sent from the posture sensor, and the operation circuit determines a relative tilt angle of the active stylus relative to the touch panel based on the second posture information of the touch device and the first posture information of the active stylus.

2. The touch driving integrated circuit according to claim 1, wherein the operation circuit sends the uplink signal with a tilt angle providing request to the active stylus through the codec, the interface circuit, and the touch panel to trigger the active stylus to send the downlink signal with the first posture information to the touch panel.

3. The touch driving integrated circuit according to claim 1, wherein the operation circuit determines whether the active stylus is currently in a writing posture or a non-writing posture based on the first posture information;
   in response to the active stylus currently being in the writing posture, the operation circuit performs a normal processing about the active stylus to report the position information of the active stylus to the system processor; and
   in response to the active stylus currently being in the non-writing posture, the operation circuit ignores the normal processing to avoid reporting the position information to the system processor.

4. The touch driving integrated circuit according to claim 1, wherein the codec decodes the downlink signal to obtain acceleration information of the active stylus;
   in response to the acceleration information indicating that an acceleration change of the active stylus toward the touch panel does not reach a threshold, the operation circuit reports mode information indicating that the active stylus is in a hover state together with the position information of the active stylus to the system processor;

in response to the acceleration information indicating that an acceleration change of the active stylus toward the touch panel reaches a threshold, the operation circuit determines that the active stylus is currently in a writing posture or a non-writing posture based on the first posture information; and in response to the acceleration information indicating that the acceleration change of the active stylus reaches the threshold and the active stylus currently being in the writing posture, the operation circuit reports the mode information indicating that the active stylus is in an ink state together with the position information of the active stylus to the system processor.

5. An operation method of a touch driving integrated circuit configured to drive a plurality of touch sensing electrodes of a touch panel, wherein the operation method comprises:

sending an uplink signal to an active stylus on the touch panel through an interface circuit of the touch driving integrated circuit and the touch panel by a codec of the touch driving integrated circuit based on a control of an operation circuit of the touch driving integrated circuit;

receiving a downlink signal sent from the active stylus through the interface circuit and the touch panel by the codec;

decoding the downlink signal by the codec to obtain first posture information about a posture of the active stylus;

providing the first posture information of the active stylus to the operation circuit by the codec;

reporting position information about a position of the active stylus on the touch panel together with the first posture information of the active stylus to a system processor by the operation circuit;

disposing a posture sensor, the touch driving integrated circuit, and the touch panel on a touch device;

obtaining second posture information about the posture of the touch device from the posture sensor by the operation circuit; and determining a relative tilt angle of the active stylus relative to the touch panel based on the second posture information of the touch device and the first posture information of the active stylus by the operation circuit.

6. The operation method according to claim 5, further comprising:

sending the uplink signal with a tilt angle providing request to the active stylus through the codec, the interface circuit, and the touch panel by the operation circuit to trigger the active stylus to send the downlink signal with the first posture information to the touch panel.

7. The operation method according to claim 5, further comprising:

determining whether the active stylus is currently in a writing posture or a non-writing posture by the operation circuit based on the first posture information;

performing a normal processing about the active stylus by the operation circuit to report the position information of the active stylus to the system processor in response to the active stylus currently being in the writing posture; and ignoring the normal processing by the operation circuit to avoid reporting the position information to the system processor in response to the active stylus currently being in the non-writing posture.

8. The operation method according to claim 5, further comprising:

decoding the downlink signal by the codec to obtain acceleration information of the active stylus;

reporting mode information indicating that the active stylus is in a hover state together with the position information of the active stylus to the system processor by the operation circuit in response to the acceleration information indicating that the acceleration change of the active stylus toward the touch panel does not reach a threshold;

determining whether the active stylus is currently in a writing posture or a non-writing posture based on the first posture information by the operation circuit in response to the acceleration information indicating that an acceleration change of the active stylus toward the touch panel reaches a threshold; and reporting the mode information indicating that the active stylus is in an ink state together with the position information of the active stylus to the system processor by the operation circuit in response to the acceleration information indicating that the acceleration change of the active stylus reaches the threshold and the active stylus currently being in the writing posture.

9. A touch device comprising:

a system processor;

a touch panel comprising a plurality of touch sensing electrodes;

a touch driving integrated circuit coupled to the system processor and the touch panel, wherein the touch driving integrated circuit drives the plurality of touch sensing electrodes of the touch panel, the touch driving integrated circuit sends an uplink signal to an active stylus on the touch panel through the touch panel, the touch driving integrated circuit receives a downlink signal sent by the active stylus through the touch panel, the touch driving integrated circuit decodes the downlink signal to obtain first posture information about a posture of the active stylus, and the touch driving integrated circuit reports position information about a position of the active stylus on the touch panel together with the first posture information of the active stylus to the system processor; and a posture sensor, wherein the touch driving integrated circuit obtains second posture information about the posture of the touch device from the posture sensor, and the touch driving integrated circuit determines a relative tilt angle of the active stylus relative to the touch panel based on the second posture information of the touch device and the first posture information of the active stylus.

10. The touch device according to claim 9, wherein the touch driving integrated circuit comprises:

an operation circuit;

an interface circuit coupled to the touch panel; and a codec coupled to the interface circuit and the operation circuit, wherein the codec sends the uplink signal to the active stylus on the touch panel through the interface circuit and the touch panel based on a control of the operation circuit, the codec receives the downlink signal sent by the active stylus through the interface circuit and the touch panel, the codec decodes the downlink signal to obtain the first posture information of the active stylus, the codec provides the first posture information of the active stylus to the operation circuit, and the operation circuit reports the position information of the active stylus together with the first posture information of the active stylus to the system processor.

11. The touch device according to claim 10, wherein the operation circuit sends the uplink signal with a tilt angle providing request to the active stylus through the codec, the interface circuit, and the touch panel to trigger the active stylus to send the downlink signal with the first posture information to the touch panel.

12. The touch device according to claim 10, wherein the operation circuit determines whether the active stylus is currently in a writing posture or a non-writing posture based on the first posture information;
   in response to the active stylus currently being in the writing posture, the operation circuit performs a normal processing about the active stylus to report the position information of the active stylus to the system processor; and
   in response to the active stylus currently being in the non-writing posture, the operation circuit ignores the normal processing to avoid reporting the position information to the system processor.

13. The touch device according to claim 10, wherein the codec decodes the downlink signal to obtain acceleration information of the active stylus;
   in response to the acceleration information indicating that an acceleration change of the active stylus toward the touch panel does not reach a threshold, the operation circuit reports mode information indicating that the active stylus is in a hover state together with the position information of the active stylus to the system processor;
   in response to the acceleration information indicating that an acceleration change of the active stylus toward the touch panel reaches a threshold, the operation circuit determines whether the active stylus is currently in a writing posture or a non-writing posture based on the first posture information; and
   in response to the acceleration information indicating that the acceleration change of the active stylus reaches the threshold and the active stylus currently being in the writing posture, the operation circuit reports the mode information indicating that the active stylus is in an ink state together with the position of the active stylus to the system processor.

14. A touch driving integrated circuit configured to drive a plurality of touch sensing electrodes of a touch panel, wherein the touch driving integrated circuit comprises:
   an interface circuit configured to be coupled to the touch panel; and
   an operation circuit coupled to the interface circuit, wherein the operation circuit receives a downlink signal from an active stylus on the touch panel through the interface circuit and the touch panel to generate position information about a position of the active stylus on the touch panel, the operation circuit sends a posture providing request to a system processor to trigger the system processor to request first posture information about a posture of the active stylus from the active stylus through a communication channel, the system processor feeds back the first posture information to the operation circuit based on the posture providing request, and the operation circuit reports the position information of the active stylus together with the first posture information of the active stylus to the system processor;
   wherein a posture sensor, the touch driving integrated circuit, and the touch panel are disposed in a touch device, the operation circuit obtains second posture information about the posture of the touch device from the posture sensor, and the operation circuit determines a relative tilt angle of the active stylus relative to the touch panel based on the second posture information of the touch device and the first posture information of the active stylus.

15. The touch driving integrated circuit according to claim 14, wherein the operation circuit sends an uplink signal to the active stylus on the touch panel through the interface circuit and the touch panel, and the operation circuit receives the downlink signal sent from the active stylus through the interface circuit and the touch panel.

16. The touch driving integrated circuit according to claim 14, wherein the operation circuit determines whether the active stylus is currently in a writing posture or a non-writing posture based on the first posture information;
   in response to the active stylus currently being in the writing posture, the operation circuit performs a normal processing about the active stylus to report the position information of the active stylus to the system processor; and
   in response to the active stylus currently being in the non-writing posture, the operation circuit ignores the normal processing to avoid reporting the position information to the system processor.

17. The touch driving integrated circuit according to claim 14, wherein the operation circuit sends an acceleration providing request to the system processor to trigger the system processor to request acceleration information of the active stylus from the active stylus through the communication channel, and the system processor feeds back the acceleration information to the operation circuit based on the acceleration providing request;
   in response to the acceleration information from the system processor indicating that an acceleration change of the active stylus toward the touch panel does not reach a threshold, the operation circuit reports mode information indicating that the active stylus is in a hover state together with the position information of the active stylus to the system processor;
   in response to the acceleration information indicating that an acceleration change of the active stylus toward the touch panel reaches a threshold, the operation circuit determines that the active stylus is currently in a writing posture or a non-writing posture based on the first posture information; and
   in response to the acceleration information indicating that the acceleration change of the active stylus reaches the threshold and the active stylus currently being in the writing posture, the operation circuit reports the mode information indicating that the active stylus is in an ink state together with the position information of the active stylus to the system processor.

18. An operation method of a touch driving integrated circuit, wherein the touch driving integrated circuit is configured to drive a plurality of touch sensing electrodes of a touch panel, and the operation method comprises:
   receiving a downlink signal sent from an active stylus through an interface circuit of the touch driving integrated circuit and the touch panel by an operation circuit of the touch driving integrated circuit to generate position information about a position of the active stylus on the touch panel, wherein the interface circuit is coupled to the touch panel, and the operation circuit is coupled to the interface circuit;

sending a posture providing request to a system processor by the operation circuit to trigger the system processor to request first posture information about the posture of the active stylus from the active stylus through a communication channel, wherein the system processor feeds back the first posture information to the operation circuit based on the posture providing request;

reporting the position information of the active stylus together with the first posture information of the active stylus to the system processor by the operation circuit;

disposing a posture sensor, the touch driving integrated circuit, and the touch panel on a touch device;

obtaining second posture information about the posture of the touch device from the posture sensor by the operation circuit; and determining a relative tilt angle of the active stylus relative to the touch panel by the operation circuit based on the second posture information of the touch device and the first posture information of the active stylus.

19. The operation method according to claim 18, further comprising:

sending an uplink signal to the active stylus on the touch panel through the interface circuit and the touch panel by the operation circuit, and receiving the downlink signal sent by the active stylus through the interface circuit and the touch panel by the operation circuit.

20. The operation method according to claim 18, further comprising:

determining whether the active stylus is currently in a writing posture or a non-writing posture based on the first posture information by the operation circuit, performing a normal processing about the active stylus by the operation circuit to report the position information of the active stylus to the system processor in response to the active stylus currently being in the writing posture, and ignoring the normal processing by the operation circuit to avoid reporting the position information to the system processor in response to the active stylus currently being in the non-writing posture.

21. The operation method according to claim 18, further comprising:

sending an acceleration providing request to the system processor by the operation circuit to trigger the system processor to request acceleration information of the active stylus from the active stylus through the communication channel, wherein the system processor feeds back the acceleration information to the operation circuit based on the acceleration providing request;

reporting mode information indicating that the active stylus is in a hovering state together with the position information of the active stylus to the system processor by the operation circuit in response to the acceleration information from the system processor indicating that an acceleration change of the active stylus toward the touch panel does not reach a threshold;

determining whether the active stylus currently being in a writing posture or a non-writing posture by the operation circuit based on the first posture information in response to the acceleration information indicating that an acceleration change of the active stylus toward the touch panel reaches a threshold; and reporting the mode information indicating that the active stylus is in an ink state together with the position information of the active stylus to the system processor by the operation circuit in response to the acceleration information indicating that the acceleration change of the active stylus reaches the threshold and the active stylus currently being in the writing posture.

22. A touch device comprising:

a communication interface circuit configured to establish a communication channel to an active stylus;

a system processor coupled to the communication interface circuit;

a touch panel comprising a plurality of touch sensing electrodes;

a touch driving integrated circuit coupled to the system processor and the touch panel, wherein the touch driving integrated circuit drives the plurality of touch sensing electrodes of the touch panel, the touch driving integrated circuit receives a downlink signal sent by the active stylus through the touch panel to generate position information about a position of the active stylus on the touch panel, the touch driving integrated circuit sends a posture providing request to the system processor to trigger the system processor to request first posture information about a posture of the active stylus from the active stylus through the communication interface circuit and the communication channel, the system processor feeds back the first posture information to the touch driving integrated circuit based on the posture providing request, and the touch driving integrated circuit reports the position information of the active stylus together with the first posture information of the active stylus to the system processor; and a posture sensor, wherein the touch driving integrated circuit obtains second posture information about the posture of the touch device from the posture sensor, and the touch driving integrated circuit determines a relative tile angle of the active stylus relative to the touch panel based on the second posture information of the touch device and the first posture information of the active stylus.

23. The touch device according to claim 22, wherein the touch driving integrated circuit comprises:

an interface circuit coupled to the touch panel; and an operation circuit coupled to the interface circuit, wherein the operation circuit receives the downlink signal sent by the active stylus through the interface circuit and the touch panel to generate the position information of the active stylus, the operation circuit sends the posture providing request to the system processor to trigger the system processor to request the first posture information of the active stylus from the active stylus through the communication channel, the system processor feeds back the first posture information to the operation circuit based on the posture providing request, and the operation circuit reports the position information of the active stylus together with the first posture information of the active stylus to the system processor.

24. The touch device according to claim 23, wherein the operation circuit sends an uplink signal to the active stylus on the touch panel through the interface circuit and the touch panel, and the operation circuit receives the downlink signal sent from the active stylus through the interface circuit and the touch panel.

25. The touch device according to claim 23, wherein the operation circuit determines whether the active stylus is currently in a writing posture or a non-writing posture based on the first posture information;

in response to the active stylus currently being in the writing posture, the operation circuit performs a normal processing about the active stylus to report the position information of the active stylus to the system processor; and in response to the active stylus currently being in the non-writing posture, the operation circuit ignores the normal processing to avoid reporting the position information to the system processor.

26. The touch device according to claim 23, wherein the operation circuit sends an acceleration providing request to the system processor to trigger the system processor to request acceleration information of the active stylus from the active stylus through the communication interface circuit and the communication channel;

in response to the acceleration information from the system processor indicating that an acceleration change of the active stylus toward the touch panel does not reach a threshold, the operation circuit reports mode information indicating that the active stylus is in a hover state together with the position information of the active stylus to the system processor;

in response to the acceleration information indicating that an acceleration change of the active stylus toward the touch panel reaches a threshold, the operation circuit determines that the active stylus is currently in a writing posture or a non-writing posture based on the first posture information; and in response to the acceleration information indicating that the acceleration change of the active stylus reaches the threshold and the active stylus currently being in the writing posture, the operation circuit reports the mode information indicating that the active stylus is in an ink state together with the position information of the active stylus to the system processor.

* * * * *